United States Patent [19]

MacLean et al.

[11] 4,092,299

[45] May 30, 1978

[54] HIGH DRAW RATIO POLYESTER FEED YARN AND ITS DRAW TEXTURING

[75] Inventors: Donald L. MacLean, Raleigh; Robert T. Estes, Cary, both of N.C.

[73] Assignee: Monsanto Company, Decatur, Ala.

[21] Appl. No.: 699,143

[22] Filed: Jun. 23, 1976

[51] Int. Cl.$^2$ ............................................. C08G 63/70
[52] U.S. Cl. ............................... 260/75 T; 264/210 F
[58] Field of Search .......................... 260/75 R, 75 T

[56] References Cited

U.S. PATENT DOCUMENTS

| | | | |
|---|---|---|---|
| 2,895,946 | 7/1959 | Huffman | 260/75 R |
| 3,033,824 | 5/1962 | Huffman | 60/75 R |
| 3,216,187 | 11/1965 | Chantry et al. | 57/140 |
| 3,335,209 | 8/1967 | Morgan et al. | 264/136 |
| 3,576,773 | 4/1971 | Vaginay | 260/22 |
| 3,689,623 | 9/1972 | Kobayashi et al. | 264/210 F |
| 3,771,307 | 11/1973 | Petrille | 57/157 TS |
| 3,772,872 | 11/1973 | Piazza et al. | 57/140 R |
| 3,816,486 | 6/1974 | Vail | 260/75 T |
| 3,822,334 | 7/1974 | Patterson | 260/75 T X |
| 3,846,377 | 11/1974 | Siegmann | 260/75 T |
| 3,874,155 | 4/1975 | Knopka | 57/140 BY |
| 3,977,175 | 8/1976 | Yoshikawa et al. | 57/157 TS |

*Primary Examiner*—Lucille M. Phynes
*Attorney, Agent, or Firm*—Robert L. Broad, Jr.

[57] ABSTRACT

Significantly higher productivity of polyester feed yarn is achieved when the polymer from which the feed yarn is melt spun is chain-branched with multifunctional chain branchers having 1–15 microequivalents of reactive branching sites based on one gram of the polymer. This productivity increase (over conventional production employing the same spinnerette in accordance with teachings of the prior art as applied generally to unbranched polymers) may be achieved specifically by spinning a feed yarn (of the same filament denier and draw ratio) at a higher throughput rate at a higher windup speed followed by draw-texturing (at the same draw ratio to the same drawn denier); or by spinning at a higher throughput rate employing the same windup speed a feed yarn of higher denier and draw-ratio followed by draw-texturing at the higher draw ratio to the same drawn denier; or by any combination thereof.

The invention herein claimed includes the high draw ratio polyester feed yarn as a new product and the process of draw-texturing high draw ratio polyester feed yarn as a new process.

3 Claims, 2 Drawing Figures

HIGH DRAW RATIO POLYESTER FEED YARN AND ITS DRAW TEXTURING

BACKGROUND OF THE INVENTION (A) Scope of the Invention

This invention relates to polyesters including copolyesters produced by condensation reactions of polymethylene glycols and dicarboxylic acids or reactive derivatives thereof, and more particularly to polyester multifilament partially oriented feed yarns suitable for draw falsetwist texturing, and to the draw-texturing thereof.

(B) The Prior Art

The drawing (or drawing and texturing) of undrawn (including partially oriented) multifilament polyester feed yarns has long been known in the prior art. Werner Roth and Rudi Schroth (Faserforsch u. Textiltech., 1960, II, No. 8, pp 353–359) demonstrated in 1960 the natural and maximum draw ratios of polyester filaments spun at spin takeup speeds of from 400–4000 meters per minute. British Pat. No. 777,625 (published June 16, 1957) taught the simultaneous drawing and texturing of polyester filaments. A most recent description of a typical partially oriented polyester multifilament feed yarn in terms of break elongation (70–180%), birefringence (of at least 0.025), crystallinity (of less than 30%), relative viscosity (of at least 18), boil-off shrinkages (of 40–60%) and low interfilament boundary coefficient of friction, is contained in U.S. Pat. No. 3,772,872.

It is also well-known to chain branch polyester polymers in order to obtain better dyeability, oil-stain release or low pilling in the fiber. Such chain branched polyesters are described in U.S. Pat. Nos. 2,895,946; 2,905,657; 3,033,824; 3,669,935; 3,669,933; 3,671,494; 3,668,187; 3,668,188; 3,669,925; and 3,576,773. These special properties are incorporated into polyester fibers by or in conjunction with the use of chain branching agents in amounts of about 0.2–0.45 mole percent of tetra functional chain branching agents such as pentaerythritol, and 0.5–0.7 mole percent of trifunctional chain branching agents such as trimesic acid for dyeability and oil-stain release. For the non-pilling polyethylene terephthalate fibers of U.S. Pat. No. 3,576,773, chain branching in the amount of y/n-2 to z/n-2 equivalent percent of n-valent chain units where $n$ is 3 or 4, $y$ is 0.2 and $z$ is 2, is employed. If pentaerythritol, for example, were used, the amounts suggested are 0.1–1 mole percent, a range corresponding, in the case of pentaerythritol, to 708–7080 ppm, or 10.32–103.2 microequivalents of hydroxyls based on one gram of the copolymer available for chain branching.

The separation of melt spinning and drawing phases in polyester filament production and the combination of drawing and texturing of polyester were effected commercially primarily to increase production speeds. So long as spinning and drawing were a part of the first phase of polyester processing, production speed was limited to the speed at which it was practical to take up the spundrawn filaments. When the drawing step was combined with texturing rather than spinning, melt spinning speeds (windup or takeup) could be increased to the maximum practical for takeup of the undrawn spun yarn without utilization of takeup potential by drawing. When the spinning speeds were increased to 3000–4000 ypm (2742–3656 mpm), the overall production increase achieved through postponing the drawing step to the second phase of processing was diminished somewhat by the fact that the draw ratio had been decreased by the higher spinning speeds. Were it possible to employ both the higher spinning speeds and increased draw ratios, (or yet higher spinning speeds with the same diminished draw ratios), production rates could be even further increased. Such an increase in production rate would involve lower capital expenditure for expensive equipment, and lower manpower requirements; and for these reasons any method by which the draw ratio can be increased in the partially oriented multifilament polyester intermediate yarn is of great value to the industry. Of nearly equal significance would be a spinning throughout increase not involving a decreased draw ratio.

SUMMARY OF THE INVENTION

Overall productivity increases of as much as 30% in making the polyester partially oriented multifilament feed yarn spun at 2000–6000 ypm (1828–5484 mpm) have been obtained through an increased polymer throughput, sometimes accompanying an increase in draw ratio of the feed yarn (with corresponding decrease in birefringence of the feed yarn).

This productivity increase (over conventional production employing the same spinnerette in accordance with teachings of the prior art as applied generally to unbranched polymers) may be attained through higher throughput spinning of a feed yarn of the same filament denier and draw ratio at higher windup speeds followed by draw-texturing at the same draw ratio to the same drawn denier; or by higher throughput spinning at the same windup speed a feed yarn of higher denier and draw-ratio followed by draw-texturing at the higher draw ratio to the same drawn denier; or by any combination thereof. The productivity increase is expressed mathmatically as follows:

$$\% \text{ increase in productivity} = [(DR_E/DR_C)(S_E/S_C) - 1] \times 100$$

where
$DR_C$ = draw ratio of unmodified polyester yarn
$DR_E$ = draw ratio of modified polyester yarn
$S_C$ = spin windup speed of unmodified polyester yarn
$S_E$ = spin windup speed of modified polyester yarn In spun denier ranges of above 5 denier per filament (dpf), in the higher spinning speed ranges, partially oriented polyester multifilament feed yarns having a tenacity of 1.2–3.0, an elongation of about 60–220% and a draw ratio of about 1.2–2.0 are produced in which the draw ratio (DR) is in accordance with the following equation derived from Table II and the examples:

$$DR \geqq 6120/S(\text{yds.}) = 5593.7/S(m)$$

with a preferred draw ratio (DR) of:

$$DR \geqq 6460/S(\text{yds.}) = 5904/S(m)$$

where $S$ is 3400–4400 ypm (3107–4022 mpm) and is the melt spinning takeup speed of the multifilament feed yarn. At these denier ranges the increase in draw ratio is at least 6%, preferably 10%, in excess of the similarly spun unbranched polyester yarn; and there is an increase within the S range as S is increased from 3400 (3107 mpm), all other factors being equal, so that at the preferred speeds of 3600 ypm (3290 mpm) and 3800 ypm (3472 mpm) and above, up to about 4400 ypm (4022 mpm), the increase in draw ratio is even more pronounced. At speeds in excess of 4400 ypm (4022 mpm) up to about 6000 ypm (5484 mpm) the increase in draw ratio, although significant, is less pronounced; similarly, at lower than 5 dpf, the increase, although significant, is not quite so spectacular.

High throughput melt spinning is made possible by the effects on the polymer obtained by copolymerizing with the polyester-forming reactants, chain branchers preferably of the tetra functional or tri functional variety, such as pentaerythritol or trimer acid in an amount so as to provide about 2-14 microequivalents (μeq) preferably 5-12 μeq of available (for branching) reactive sites based on one gram of copolymer in a finished copolymer having an intrinsic viscosity of 0.75-0.52. At these and at intermediate ranges of chain branching, and to a lesser extent as the amount of chain branching is varied down to about 1 μeq/gm and up to about 15 μeq/gm, surprising and unforeseeable spinning throughput increases, as may be reflected by increases in the draw ratios of the partially oriented polyester multifilament feed yarn (which has been spun to the same windup speed), are observed. These increased draw ratios, in conjunction with higher spinnerette extrusion volume provide productivity increases in making the textured filament product. If the windup speed is held constant, the productivity increase is proportional to the increased draw ratio, involving, for example, a 10% increase in draw ratio for branched polyethylene terephthalate (PET) containing about 660 parts per million, based on the polymer, of pentaerythritol and providing about 10 microequivalants per grams of branching hydroxyls. The feed yarn has a higher hot shoe breaking strength and a somewhat lower tenacity than unmodified polyester partially oriented multifilament feed yarn. Birefringence values are decreased typically from about 0.038 to 0.021 (PET with 500 ppm pentaerythritol spun at 3400 ypm (2742 mpm) as the draw ratios increase up to the maximum draw ratio, but the birefringence (unlike the draw ratio which at this point reverses its trend) continues to decrease as the modification level (of branching) increases. Draw ratios of a 7.4 dpf (260/35) PET yarn with 500 ppm pentaerythritol are increased from about 1.7 in the unbranched polyester to about 1.8-1.9 in the branched polyester spun at 3400 ypm and the overall productivity rate is increased to about 30% with spinning speeds of 4200-4400 ypm (3840-4023 mpm), with productivity increases of over 20% at lower and higher speeds.

One aspect of this invention is (as a new article of manufacture) a melt spun partially oriented polyester multifilament feed yarn having a tenacity of about 1.2-3.0, a spun denier of at least about 5 dpf, an elongation of about 60-220% and a draw ratio (DR) of:

$$\geq 6120/S(yds) = 5593.7/S(m)$$

with a preferred draw ratio (DR) of:

$$\geq 6460/S(yds) = 5904/S(m)$$

Where S is 3400-4400 ypm (3107-4022 mpm) and is the melt spinning takeup speed of the multifilament feed yarn.

Yet another aspect of this invention is the draw-texturing of partially oriented polyester multifilament feed yarn having a tenacity of about 1.2-3.0, a spun denier of at least about 5 dpf and an elongation of about 60-220%, at the draw ratios described above.

Considered as a part of a separate and independent but related invention, on which U.S. patent coverage is being sought, is the branched copolymer described above, chain branched with a chain-branching agent to the extent provided by 1-15 microequivalents of available chain branching reactive sites, based on one gram of the copolymer, with a preferred range of 2-14 and a most preferred range of 5-12.

Considered as another part of the aforementioned separate invention is an improvement in the process wherein esters of a dicarboxylic acid and a glycol are polymerized to form a high molecular weight polyester polymer having an intrinsic viscosity of 0.75-0.52, and then melt spun into filaments to be taken up at speeds of 2000-6000 ypm (1828-5484 mpm) with controlled cooling between the spinning and the takeup and with other spinning conditions controlled so as to provide, in the multifilament feed yarn, a tenacity of 2-3.0, an elongation of 90-220%, and a draw ratio of about 1.6-2.0; and thereafter orientation drawn, the improvement being copolymerizing with the esters a chain branching agent in an amount as to provide 1-15 microequivalents (preferably 2-14 and even more preferably 5-12) of chain branching reactive sites based on one gram of the polymer.

Considered as another separate and independent invention on which U.S. patent coverage is being sought, is the process of melt spinning a modified polyester polymer into a polyester partially oriented multifilament feed yarn to achieve a productivity increase over otherwise similarly spun unmodified polyester polymer of at least 20%, preferably 30% wherein $$\% \text{ increase in productivity} = [(DR_E/DR_C)(SE/SC)-1] \times 100$$

where
$DR_C$ = draw ratio of unmodified polyester yarn
$DR_E$ = draw ratio of modified polyester yarn
$SC$ = spin windup speed of unmodified polyester yarn
$SE$ = spin windup speed of modified polyester yarn

BRIEF DESCRIPTION OF THE DRAWING

To further understand the invention, reference will be made to the attached drawings which form a part of the present application.

DEFINITIONS AND TESTS

Figure 1:
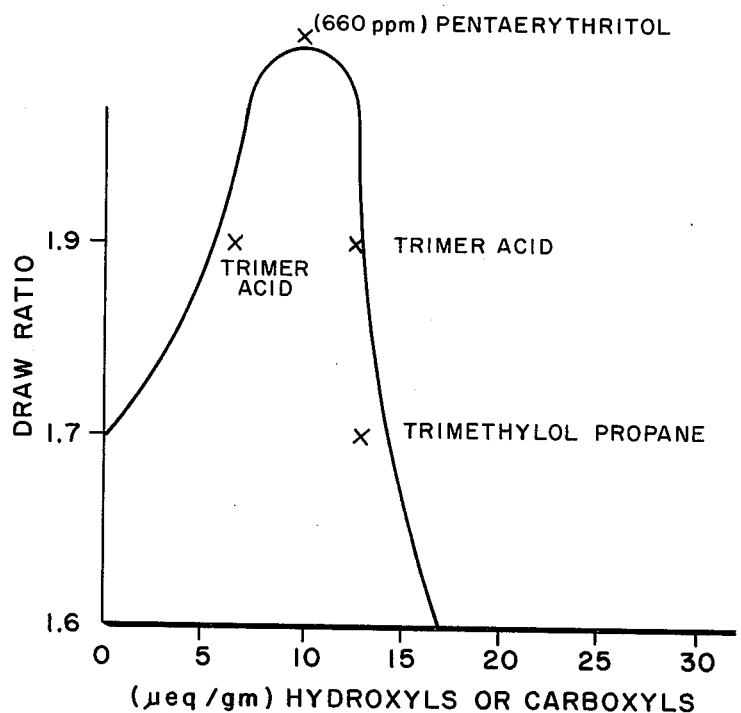
FIG. 1 is a graph showing the relationship of the number of available hydroxyls or carboxyls for chain branching to the increased draw ratio for branched polyethylene terephthalate spun at 3400 ypm; (3109 m/m) the polymer having an intrinsic viscosity of 0.62.

"Draw Ratio" is defined as that ratio of final yarn length to original yarn length that yields a drawn yarn product which has 30% elongation at the break. Unless otherwise indicated herein draw ratio is conveniently determined by ratio of the circumferential speed of the initial rolls to that of the final rolls of the drawing machine, in conjunction with false twist (pin) texturing. A drawn yarn with 30% elongation at its maximum tenacity is representative of commercial practice. Spun yarns are drawn at two or more draw ratios selected to give a drawn yarn of about 30% elongation. The elongations of these drawn yarns are then measured and if none of the selected draw ratios give a drawn yarn of exactly 30% elongation the draw ratio is calculated by linear interpolation or extrapolation of the draw ratios of the two drawn yarns nearest 30% elongation.

Examples:

| | Draw Ratio | % Elongation | Calculated Draw Ratio for 30% Elongation |
|---|---|---|---|
| | 1.70 | 28.7 | |
| and: | 1.60 | 33.6 | 1.67 |
| | 1.70 | 31.3 | |
| | 1.60 | 35.2 | 1.73 |

Whenever draw ratios of one composition are compared with "similarly spun" samples of another composition the comparison contemplates identical finishes and identical conditions wherever possible of both spinning and texturing within those ordinarily considered reasonably optimum according to the current state of the art as reflected in U.S. Pat. No. 3,772,872. Partially oriented polyester multifilament feed yarn is customarily used in draw texturing, but texturing may not be essential to its end usage.

By "texturing" is meant conventional pin, friction or other false-twist texturing to produce a yarn of the torque or heatset variety. In conventional pin-type false twist texturing a twist per inch (tpi) of 60–80 typically is set in the yarn.

Non-texturing draw ratios will ordinarily be 5–15% less than draw ratios measured as above described. Draw ratios in friction false twist texturing will ordinarily be 5–10% more than draw ratios are measured herein.

Specific viscosity ($\eta sp$) is measured at a given concentration ½ g. of the polymer per deciliter of a solvent having a weight ratio: 60% phenol/40% tetrachloroethane; by measuring the efflux time using a modified Ostwald-Cannon-Fenske viscometer. Efflux time of the solvent is measured similarly and the specific viscosity can then be calculated.

Intrinsic viscosity ($\eta$) is calculated using the relationship $$\eta = (\sqrt{2}/C \ \eta sp - 1 n \eta_{rel})^{\frac{1}{2}}$$

where $$\eta_{rel} = 1 + \eta sp$$

C is the amount of polymer in grams per deciliter of solvent.

By "polyester", "polyester polymer", or "polyester copolymer" as used herein is meant any fiber-forming substance containing at least about 95% by weight of the ester of terephthalic acid and ethylene glycol. "Polymer" unless otherwise indicated is used generically to include "Copolymer".

The "residual elongation" of the spun yarn is the elongation at maximum tenacity when a 5-inch (12.7 cm.) sample of the spun yarn is extended at the rate of 12 inches/min (30.48 cm/min). Elongation is expressed:

% Elongation = $(L_f - L_o)/L_o \times 100$ where
$L_f$ = length at maximum tenacity
$L_o$ = original length The yarns are conditioned at least 24 hours at 65% RH and 72° F (20.2° C.) before testing. The residual elongation is useful as an approximation of the draw ratio that may be obtained in drawing or draw-texturing.

The term "Percent Increase in Productivity" is defined by the following equation:

% Increase in Productivity = $[(DR_E/DR_C)(SE/SC) - 1] \times 100$ where
$DR_E$ = Draw Ratio of modified yarn
$DR_C$ = Draw Ratio of unmodified control yarn
$SE$ = Spinning windup speed of modified yarn
$SC$ = Spinning windup speed of control yarn The final drawn deniers of the chain branched and control yarns compared in this formula are understood to be equal. The increase in productivity may be in spinning at the same speed at a higher throughput speed (if desirable through the same size spinnerette orifice) a heavier yarn (larger diameter filaments) to be drawn (at a higher draw ratio) to the same denier as the control yarn (filaments). Alternatively the increase in productivity may be in spinning at higher throughput speeds (through the same spinnerette if desired) and at higher wind-up speeds, a yarn (filaments) of the same denier and draw ratio as that spun from unmodified poly(ethylene terephthalate) at lower throughput and wind-up speeds under present practice. Any combination of the larger spun deniers with higher draw ratios in the feed yarns and higher wind-up speeds in the spinning step (which of course tends to lower spun deniers and draw ratios) may also be used.

DESCRIPTION OF THE PREFERRED EMBODIMENTS

The synthetic linear condensation polyesters contemplated in the practice of the invention are those formed from dicarboxylic acids and glycols, and copolyesters or modifications of these polyesters and copolyesters. In a highly polymerized condition, these polyesters and copolyesters can be formed into filaments and the like and subsequently oriented permanently by drawing. Among the polyesters and copolyesters specifically useful in the instant invention are those resulting from heating one or more of the glycols of the series HO(CH$_2$)$_n$OH, in which "n" is an integer from 2 to 10, or cycloaliphatic glycols, with one or more dicarboxylic acids or ester-forming derivatives thereof. Among the dicarboxylic acids and ester-forming derivatives thereof useful in the present invention there may be named terephthalic acid, isophthalic acid, p,p'-dicarboxybiphenyl, p,p'-dicarboxydiphenylsulfone, p,p'-dicarboxydiphenylmethane, and the aliphatic, cycloaliphatic, and aryl esters and half-esters, ammonium and amine salts, and the acid halides of the above-named compounds, and the like. Examples of the polyhydric alcohols which may be employed in practicing the instant invention are ethylene glycol, trimethylene glycol, and tetramethylene glycol, cyclohexane dimethanol, and the like. Polyethylene terephthalate, however, is the preferred polymer because of the ready availability of terephthalic acid or dimethyl terephthalate and ethylene glycol, from which it is made. It also has a relatively high melting point of about 250° through 265° C., and this property is particularly desirable in the manufacture of filaments for the textile industry.

The chain branching agents which are employed to increase the draw ratio of these polyesters have a functionality greater than 2, that is, they contain more than two functional groups such as hydroxyl, carboxyl or ester.

Examples of suitable compounds are pentaerythritol; compounds having the formula R—(OH)$_n$ wherein R is an alkylene group containing from three of six carbon atoms and $n$ is an integer from 3 to 6, for example, glycerols, sorbitol, 1,2,6-hexanetriol and the like; compounds having the formula; R—(CH$_2$OH)$_3$ wherein R is an alkyl group containing from two to six carbon atoms, for example, trimethylolethane, trimethylol propane, and the like compounds up to trimethylol hexane; and the compounds having the formula:

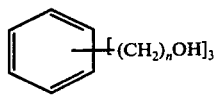

wherein $n$ is an integer from 1 to 6. As examples of compounds having the above formula, there may be named 1,3,5-trimethylol benzene, 1,3,5-triethylol benzene; 1,3,5-tripropylol benzene, 1,3,5-tributylol benzene; and the like.

Aromatic polyfunctional acids or their esters may also be employed in this invention as chain-branching agents, and particularly those having the formula:

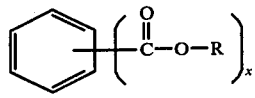

wherein R is H or an alkyl group containing one to three carbon atoms and $x$ is an integer of 3 to 6. As examples of compounds having the above formula, there may be named trimesic acid, trimethyl trimesate, and tetramethyl pyromellitate, and the like. In addition, there may be employed mixtures of the above acids and esters which are obtained in practical synthesis. That is, in most instances, when preparing any of the compounds having the above formula, other related compounds having the same formula may be present in small amounts as impurities. This does not affect the compound as a chain-branching agent in the preparation of the modified polyesters and copolyesters described herein.

These chain branching agents are used in an amount so as to provide 1–15 (with increasing preferred ranges of 2–14 and 5–12) microequivalents of available reactive sites based on one gram of the polymer. In the case of pentaerythritol, an extremely high draw ratio is obtained by employing 660 parts per million or about 10 microequivalents per gram. Trifunctional and tetrafunctional chain branching agents such as pentaerythritol, trimethylol propane (2 methylol-2 methyl-1,3 propanediol and trimer acid (a commercial trimerized fatty acid known as "Empol 1041 Trimer Acid" having at least 90% of a C$_{54}$ tribasic acid (derived by polymerizing 3 molecules of oleic acid via the double bond) having a molecular weight of about 845 and 10% or less of the dimer having a molecular weight of about 585), are preferred. By available reactive sites is meant the reactive sites normally available in the linear polymer for chain branching, which is the total number of reactive sites less the two required to form a linear molecule. If the total number of reactive sites exceeds four per molecule, steric hindrance may prevent full utilization of available sites and somewhat more of the chain brancher may be required.

In preparing the polymer, the dibasic acid or ester forming derivative thereof, and the chain branching agent may be charged to the reaction vessel at the beginning of the first stage of the esterification reaction, the reaction proceeds as in any well-known esterification polymerization process.

When preparing the polyester from an ester, such as dimethyl terephthalate, the first stage of reaction may be carried out at 170° to 180° C. and at a pressure of 0 to 7 p.s.i.g. If the polyester is prepared from the acid, such as terephthalic acid, the first stage of reaction may be carried out at about 220° to 260° C. and at pressures of from atmospheric to about 60 p.s.i.g. The methanol or water evolved during the first stage of reaction is continuously removed by distillation. At the completion of the first stage, the excess glycol, if any, is distilled off prior to entering the second stage of the reaction.

In the second or polymerization stage, the reaction may be conducted at reduced pressures and preferably in the presence of an inert gas, such as a nitrogen blanket over the reactants, the blanket desirably containing less than 0.003 percent oxygen. For optimum results, a pressure within the range of less than 1 mm. up to 5 mm. of mercury is employed. This reduced pressure is necessary to remove the free ethylene glycol and the water that is formed during this stage of the reaction, the ethylene glycol and water being volatilized under these conditions and removed from the system. The polymerization step is conducted at a temperature in the range of 220° to 300° C. This stage of the reaction may be effected either in the liquid melt or solid phase. In the liquid phase, particularly, reduced pressures must be employed in order to remove the free ethylene glycol and water which emerges from the polymer as a result of the condensation reaction.

Although the process of this invention may be conducted stepwise, it is particularly adaptable for use in the continuous production of polyesters. In the preparation of the described polyesters, the first stage of the reaction takes place in approximately ¾ to 2 hours. The use of an ester-interchange catalyst is desirable when starting with dimethyl terephthalate. In the absence of a catalyst, times up to 6 hours may be necessary in order to complete this phase of the reaction. In the polymerization stage, a reaction time of approximately 1 to 4 hours may be employed with a time of 1 to 3 hours being the optimum, depending on catalyst concentration, temperature, viscosity desired, and the like.

The linear condensation polyesters, produced in accordance with the present invention, have intrinsic viscosities of the order of 0.75–0.52.

Melt spinning of the polymer is at takeup speeds of 2000–6000 ypm (1828–5484 mpm), with preferred takeup speeds of 3000–5000 ypm (2742–4570 mpm) under conventional high speed melt spinning conditions, as described in U.S. Pat. No. 3,771,307 to Petrille, hereby incorporated by reference, except that wherever conditions are adjusted to obtain specific properties in the feed yarn, it must be noted that elongation and draw ratios are higher and birefringence is lower in the multifilament feed yarn of this invention than that illustrated for similarly spun unbranched yarns of the prior art as exemplified by the Petrille patent, and therefore higher spinning speeds may be employed in spinning and/or higher draw ratios may be employed in drawing. With respect to the melt spinning, the filaments are cooled as they are pulled away from the spinnerette at a speed which causes them to be greatly attenuated before reaching the pulling means. The cooled filaments may be forwarded to the windup by high speed pulling rolls or the like at substantially the same speed as the filaments are wound up, and without conventional drawing. The cooled filaments may be interlaced as described in Bunting et al. U.S. Pat. No. 2,985,995 before the windup or at any time prior to texturing. The cooling conditions are preferably controlled as described in U.S. Pat. No. 3,771,307. In the examples, free circulation of the air takes place with the motion of the filaments, and the filaments travel a distance of about 20 feet (6.1 meters) in the cooling medium. The filaments can be cooled more quickly with a force flow of gas, e.g., 70° F. (20.2° C.) air. Effective temperature and flow conditions for the cooling medium, selected distance of travel in the cooling medium and filament speed (within the indicated range of windup speeds), for producing suitable feed yarn, can readily be determined by varying controllable conditions and measuring the structural integrity values.

As in conventional false-twisting texturing, a lubricating finish should be applied to the feed yarn to facilitate the draw-texturing operation.

EXAMPLE 1

Poly(ethylene terephthalate) is prepared in a laboratory scale continuous polymerization unit. The equipment consists of an apparatus to continuously feed a slurry of ingredients of a stirred reactor operated at 34.6 p.s.i. (178.93 cm Hg) and 270° C. After an average dwell time of 2 hours the mixture is metered to a 7-tray bubble cap column, passing downward at 280° C. against a countercurrent flow of 7500 cm/min of dry nitrogen. The low molecular weight polymer is metered to a horizontal tubular reactor stirred by a cage-type agitator. Average dwell time in this final reactor is approximately 2 hours, temperatures and/or pressures are adjusted to give a final polymer intrinsic viscosity of 0.65. Temperatures are commonly 275°–290° C., pressures commonly 1–10 mm Hg. Water and glycol are removed continuously from all stages of the polymerization.

The slurry feed to this polymerization system consists principally of terephthalic acid and ethylene glycol in a ½ molar ratio. Minor components consisted of an antimony compound (antimoney glycoloxide) at 290 ppm antimony (calculated on the weight of polymer theoretically produced) as a catalyst, titanium dioxide at 3000 ppm as a delusterant, and triphenyl phosphite at 300 ppm as a stabilizer.

Feed rates are adjusted throughout to yield 5.0 lbs./hour of a polymer of the specified viscosity. The molten polymer is extruded in a strand, quenched in water and cut into pellets. The pellets are dried under heat and vacuum to a moisture content of less than 0.005%.

The dried pellets are fed into a 1.5 inch extruder with extruder temperatures adjusted to feed a 270° C. polymer melt into an attached melt spinning pump, filter, and spinnerette assembly. Molten polymer is extruded at 295° C. through a spinnerette having 35 holes, each of 9.0 mils diameter. Polymer throughput is at a constant rate of 89.8 g/min. The molten threadline is cooled in a current of air at room temperature and wound up at speeds ranging from 3000 to 4400 yds/min (2743–4023 m/min). The constant polymer throughput rate gives yarns that vary in denier from 295 denier (8.43 dpf) at 3000 yd/min (2743 m/min) to 201 denier (5.74 dpf) at 4400 yd/min (4023 m/min).

The spun yarns are simultaneously drawn and false twist textured on a single-position laboratory draw-texturizer. The 40 inches (101.6 cm) primary heater and 16 inches (40.64 cm) secondary heater are at 200° C., false twist at 60 turns per inch (23.6 t.p. cm.) (of final yarn length) is inserted at a point between the heaters, and the forward speed of the yarn at windup is 200 yds/min. (183 m/m). Draw ratios are adjusted to yield drawn, textured yarns of about 30% elongation at break with filament deniers of 3.4–4.8.

EXAMPLE 2

This example illustrates the increase in spinning productivity obtained with branched polymers spun at high speeds.

Polyesters are prepared, spun and draw-textured as in Example 1 but with the addition of a small amount of a polyfunctional chain branching agent. Pentaerythritol is added to the initial slurry in amounts ranging from 100 ppm (based on theoretical polymer weight) to 750 ppm. With chain branching, the residual elongation in yarns spun at high speed, above 3000 ypm (2743 m/min), is surprisingly higher than the residual elongation of unbranched poly(ethylene terephthalate). The residual elongation of the spun yarn is defined as the elongation at the break point when the yarn is extended at the rate of 240% of its initial length/min. The increase in residual elongation over the unbranched control tends to increase as the spinning speed increases as shown in Table I.

The portion of this increased residual elongation in the spun yarn that can be utilized as increased draw ratio during the draw-texturing operation is given in Table II. The percentage increase in productivity over unbranched poly(ethylene terephthalate) spun at the same speed is illustrated in Table III and FIG. 2.

Table I

| Spinning Speed | | Residual Elongation in Spun Yarns Amount of Pentaerythritol in Polyester (ppm) | | | | | |
|---|---|---|---|---|---|---|---|
| yd/min | m/min | 0 | 100 | 200 | 500 | 625 | 750 |
| 2500 | 2286 | 206 | 191 | 208 | 205 | nd | nd |
| 3000 | 2743 | 158 | 164 | 170 | 175 | nd | nd |
| 3400 | 3109 | 128 | 133 | 147 | 161 | 166 | 170[1] |
| 3600 | 3292 | 117 | 121 | 144 | 156 | 165 | 163[1] |
| 3800 | 3475 | 105 | 116 | 135 | 150 | 143 | 154[1] |
| 4000 | 3658 | 92 | 107 | 127 | 147 | 138 | 143[1] |
| 4200 | 3848 | 90 | 100 | 118 | 137 | 138 | 135[1] |
| 4400 | 4023 | 82 | 90 | 114 | 124 | 135 | nd |

[1]Would not spin at 295° C. under the same conditions as other polymers in this example. Yarns marked "1" were spun with difficulty at 305° C.
nd = not determined Table II

| Spinning Speed | | Draw Ratio Yielding Textured Yarns with 30% Elongations Amount of Pentaerythritol in Polyester (ppm) | | | | | |
|---|---|---|---|---|---|---|---|
| y/min | m/min | 0 | 100 | 200 | 500 | 625 | 750[2] |
| 3000 | 2743 | 1 | 1.93 | 1.91 | nd | nd | nd |
| 3400 | 3109 | 1.68 | 1.74 | 1.89 | 1.88 | 1.90 | < 1.8 |
| 3600 | 3292 | 1.60 | 1.64 | 1.83 | 1.87 | nd | nd |
| 3800 | 3475 | 1.44 | 1.63 | 1.77 | 1.88 | 1.72 | ca 1.7 |
| 4000 | 3658 | 1.41 | 1.62 | 1.73 | 1.85 | 1.70 | ca 1.7 |
| 4200 | 3848 | 1.40 | 1.55 | 1.67 | 1.80 | 1.70 | nd |

Table II-continued

| Draw Ratio Yielding Textured Yarns with 30% Elongations | | | | | | |
|---|---|---|---|---|---|---|
| Spinning Speed | | Amount of Pentaerythritol in Polyester (ppm) | | | | |
| y/min | m/min | 0 | 100 | 200 | 500 | 625 | 750[2] |
| 4400 | 4023 | 1.31 | 1.49 | 1.66 | 1.70 | 1.60 | < 1.7 |

[1]Would not draw-texture, yarn melts on heaters.
[2]Poor quality of spun yarn hinders accurate determination of Draw Ratio.
ca = approximately Table III

| Percentage Increase in Productivity Compared to Conventionally Spun and Textured Poly(ethylene terephthalate) | | | | | | |
|---|---|---|---|---|---|---|
| Spinning Speed | | Amount of Pentaerythritol in Poly(ethylene terephthalate) (ppm) | | | | |
| yds/min | m/min | 100 | 200 | 500 | 625 | 750 |
| 3400 | 3109 | 4 | 13 | 12 | 13 | 7[1] |
| 3600 | 3292 | 3 | 14 | 17 | nd | nd |
| 3800 | 3475 | 13 | 23 | 31 | 19 | 18[1] |
| 4000 | 3658 | 15 | 23 | 31 | 21 | 21[1] |
| 4200 | 3848 | 11 | 19 | 29 | 22 | nd |
| 4400 | 4023 | 14 | 27 | 30 | 22[1] | 22[1] |

[1]Value questionable due to variability in yarn properties.

Figure 2:
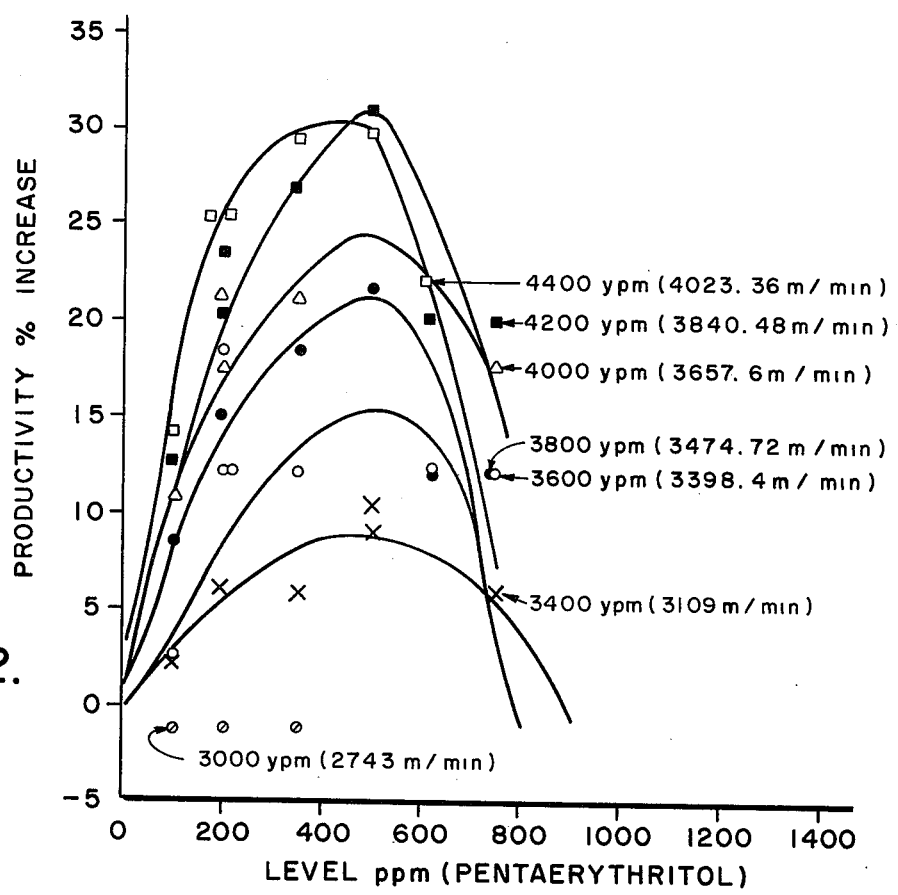
FIG. 2 is a graph showing the relationship of the amounts of chain branching agent present in yarns spun at various spinning speeds to the productivity increase accomplished by the action of the chain branching agent, the polymer in each case having an intrinsic viscosity of 0.65.

Two trends are apparent in Tables II and III and FIG. 2. First, productivity increases with increased chain branching, passes through an optimum level and declines. Second, productivity in the optimum chain branching range increases with increased spinning speed.

The optimum level of chain branching shown will not necessarily be applicable to polyesters differing in composition or processing from these examples. General experience with processing of polyesters would cause one skilled in the art to anticipate that the optimum level of chain branching for maximum productivity increase would be influenced by a number of factors including, but not necessarily restricted to, spinning temperature, intrinsic viscosity, quenching rate, denier per filament, and comonomers or unreactive additives introduced into the polymer. Type of equipment has a significant effect on spun yarn and drawn yarn properties. Optimum levels of chain branching and the productivity increase obtained will vary with equipment. For this reason, comparisons of chain branched yarns with unmodified poly(ethylene terephthalate) must be made on the same equipment to be meaningful. At the higher levels of chain branching shown and under the processing conditions used, the strength of the yarn becomes marginal for drawtexturing and the productivity declines.

Productivity of the branched polymers definitely increases with spinning speed over most of the speed range capability of the equipment used. It is impossible to determine with this equipment whether the productivity curve reaches a maximum at an optimum spinning speed, levels off above a given speed, or continues to increase with spinning speed.

EXAMPLE 3

This example illustrates that productivity increased by chain branching is not limited to tetrafunctional branching agents. Polymers were prepared as in Example 1 except that several different polyfunctional compounds were used as chain-branching agents. These polymers were spun at 3400 ypm (3109 m/min). Table IV shows that the residual elongations of the yarns spun from all the branched chain polymers are higher than the elongation of the unbranched control. Draw ratios of the branched chain yarns would also be higher as illustrated in Table I and II.

Table IV

| | Residual Elongation in Spun Yarns (all spun at 3400 ypm) | | | | |
|---|---|---|---|---|---|
| Branching Agent | Total No. of Reactive Groups per Molecule | ppm in Polymer | μeq/g Polymer | Spun Yarn Elong (%) | Draw Ratio |
| None | — | — | — | 128 | 1.68 |
| Trimer Acid | 3 | 11,800 | 6.5 | 147 | 1.80 |
| Pentaerythritol | 4 | 660 | 9.7 | 165 | 1.94 |
| Mellitic Acid | 6 | 840 | 9.8 | 165 | 1.85 |
| Trimer Acid | 3 | 23,600 | 12.9 | 144 | 1.78 |
| Trimethylol Propane | 3 | 1,730 | 12.9 | 156 | 1.79 |
| Mellitic Acid | 6 | 1,260 | 14.7 | 163 | 1.85 |
| Pentaerythritol | 4 | 1,320 | 19.4 | 179 | nd |

As illustrated, all of the polyfunctional compounds are effective in increasing the spun yarn elongation (and thus spinning productivity) but some are apparently more effective than others.

EXAMPLE 4

This example illustrates that chain branching increases the productivity of copolyesters as well as poly(ethylene terephthalate) (PET). A copolymer [of PET and a hydantoin-containing compound of the following structure:

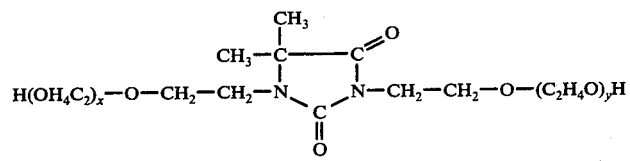

where:
x+y averages 10]
was prepared in the manner described from the production of the PET homopolymer in Example I. [The weight ratios were 5% of the hydantoin compound and 95% PET.] The resulting polymer had a melting point of 246° C. and an intrinsic viscosity of 0.67. A second copolymer of the same composition except for the addition of 500 ppm pentaerythritol as a chain branching agent was prepared in the same manner as the unbranched copolymer. This branched polymer had a melting point of 247° C. and an intrinsic viscosity of 0.65.

Yarns spun from the chain-branched copolymer at high windup speeds had much higher residual elongations and much higher draw ratios in drawtexturing than did yarns similarly spun from the unbranched copolymer (see Table V).

Table V

| | Drawtexturing Draw Ratios of Copolyesters | | | |
|---|---|---|---|---|
| Spinning Speed | Residual Elongation in Spun Yarn (%) | | Draw Ratio | |
| ypm | m/m | Unbranched | Branched[1] | Unbranched | Branches[1] |
| 3400 | 3109 | 127 | 161 | 1.75 | 1.94 |
| 3600 | 3292 | 119 | 153 | 1.73 | 1.88 |

Table V-continued

| | | Drawtexturing Draw Ratios of Copolyesters | | | |
|---|---|---|---|---|---|
| Spinning Speed | | Residual Elongation in Spun Yarn (%) | | Draw Ratio | |
| ypm | m/m | Unbranched | Branched[1] | Un-branched | Branches[1] |
| 3800 | 3475 | 108 | 146 | 1.68 | 1.84 |
| 4000 | 3658 | 94 | 142 | 1.57 | 1.80 |
| 4200 | 3848 | 88 | 136 | 1.53 | 1.79 |
| 4400 | 4023 | 80 | 129 | 1.41 | 1.71 |

[1]Branched with 500 ppm pentaerythritol on polymer weight.

EXAMPLE 5

This example illustrates that polymers with the proper amount of chain branching give increased spinning productivity if the spun yarn is to be further oriented without simultaneously texturing. Polymers and spun yarns prepared as in Example 1 were drawn at 100 ft/min. (feed roll speed) with one wrap around a 1.5 inch diameter heated pin (80° C.) between the feed roll and the draw roll. The yarns were drawn at draw ratios yielding yarns with approximately 30% elongation, as shown in the following table.

Table VI

| Draw Ratios Yielding Untextured Yarns with Approximately 30%, Elongation (all yarns spun at 3400 ypm) | | | |
|---|---|---|---|
| Amount of Pentaerythritol (ppm) | Draw Ratio | Drawn Yarn Tenacity (gpd) | Elongation (%) |
| none | 1.72 | 4.1 | 29 |
| 200 | 1.88 | 4.0 | 29 |
| 350 | 1.88 | 3.3 | 33 |
| 500 | 1.88 | 3.1 | 37 |

EXAMPLE 6

This example illustrates that the chain-branched polymers show increased spinning productivity even at extremely high windup speeds. Polymers were prepared as in Example 1 and spun as in Example 1 except the windup speeds were much higher (5500-6000 ypm, 5030-5488 mpm). Chain-branched polymers gave yarns of higher residual elongation and higher draw ratio than the unbranched controls as shown in Table VII.

Table VII

| Productivity Increase with Branched Chain Polyesters at High Windup Speeds | | | | | |
|---|---|---|---|---|---|
| Amount of Pentaery-thritol (ppm) | Windup Speed | | Residual Elongation in Spun yarn (%) | Draw Ratio | Productivity Increase (%) |
| | ypm | mpm | | | |
| none | 6000 | 5030 | 50 | 1.18 | |
| 200 | 6000 | 5030 | 62 | 1.30 | 10 |
| none | 5500 | 5488 | 54 | 1.21 | |
| 500 | 5500 | 5488 | 96 | 1.38 | 14 |

We claim:

1. A melt spun partially oriented polyester multifilament feed yarn made from a polyester polymer containing a tri or tetrafunctional chain brancher in such an amount that the polymer has 2-14 microequivalents of reactive branching sites per gram of polymer, said feed yarn having a tenacity of about 1.2-3.0, a spun denier of at least about 5 dpf, an elongation of about 60-220%, and a draw ratio (DR) in accordance with the following:

$$DR \geq 5593.7/S$$

where S is 3107-4022 meters per minute and is the melt spinning take-up speed of the multifilament feed yarn.

2. The multifilament feed yarn of claim 1 wherein $$DR \geq 5904.4/S$$

3. The process of claim 2 wherein the polymer contains such an amount of the chain brancher that the polymer has 5 to 12 microequivalents of reactive branching sites per gram of polymer.

* * * * *

UNITED STATES PATENT OFFICE
CERTIFICATE OF CORRECTION

PATENT NO. : 4,092,299
DATED : May 30, 1978
INVENTOR(S) : Donald L. MacLean and Robert T. Estes It is certified that error appears in the above-identified patent and that said Letters Patent are hereby corrected as shown below:

Col. 2, Line 12, "throughout" should read ---throughput---;

Col. 5, line 50, the formula read ---

$$\eta = (\sqrt{2}/C \ \eta sp - ln\eta_{rel}^{1/2}$$

should read:

$$--- \ \eta = \sqrt{2}/C \ [\eta sp - ln\eta_{rel}]^{1/2} \ ---$$

Signed and Sealed this

Twenty-fourth Day of October 1978

[SEAL]

Attest:

RUTH C. MASON
Attesting Officer

DONALD W. BANNER
Commissioner of Patents and Trademarks